(12) United States Patent
Belani et al.

(10) Patent No.: US 9,215,548 B2
(45) Date of Patent: *Dec. 15, 2015

(54) METHODS AND SYSTEMS FOR RATING PRIVACY RISK OF APPLICATIONS FOR SMART PHONES AND OTHER MOBILE PLATFORMS

(75) Inventors: Rohyt Belani, New York, NY (US); Aaron Higbee, Leesburg, VA (US)

(73) Assignee: NCC GROUP SECURITY SERVICES, INC., San Francisco, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 13/229,512

(22) Filed: Sep. 9, 2011

(65) Prior Publication Data

US 2012/0072991 A1    Mar. 22, 2012

Related U.S. Application Data

(60) Provisional application No. 61/385,200, filed on Sep. 22, 2010.

(51) Int. Cl.
*G06F 7/04* (2006.01)
*G06F 17/30* (2006.01)
(Continued)

(52) U.S. Cl.
CPC .............. *H04W 4/003* (2013.01); *H04L 67/34* (2013.01); *H04W 4/001* (2013.01); *H04W 12/02* (2013.01); *H04W 12/08* (2013.01)

(58) Field of Classification Search
CPC ......... G06F 21/50; G06F 21/51; G06F 21/52; G06F 21/56; G06F 21/562; G06F 21/563; G06F 21/564; G06F 21/566; G06F 21/577; G06F 2221/033; G06F 21/57
USPC .............................. 726/22, 23, 26
See application file for complete search history.

(56) References Cited

U.S. PATENT DOCUMENTS

2003/0156549 A1    8/2003    Binder et al.
2005/0027983 A1    2/2005    Klawon
(Continued)

FOREIGN PATENT DOCUMENTS

| GB | 2422919 A | 8/2006 |
|---|---|---|
| WO | 2007/051394 A1 | 5/2007 |
| WO | 2008/003822 A1 | 1/2008 |

OTHER PUBLICATIONS

Leavitt, N.; Mobile phones: the next frontier for hackers?; Computer on Issue Date: Apr. 2005 vol. 38, Issue:4; On pp. 20-23 ISSN: 0018-9162; INSPEC Accession No. 8403751 Cited by: 14; Digital Object Identifier: 10.1109/MC.2005.134 Date of Current Version: May 23, 2005 Sponsored by: IEEE Computer Society.

(Continued)

*Primary Examiner* — Andrew Nalven
*Assistant Examiner* — Quy Pham
(74) *Attorney, Agent, or Firm* — Ascenda Law Group, PC

(57) ABSTRACT

Methods and systems for evaluating and rating privacy risks posed by applications intended for deployment on mobile platforms. Validating the "intent" of a mobile platform application vis-à-vis its impact on user privacy, as viewed from an end-user's perspective allows those end-users to make better-informed decisions concerning the downloading, installation and/or operation of mobile platform applications. In making such assessments user preferences can be taken into account. Privacy scores are provided through sales channels for the applications, thereby affording potential users the opportunity to assess whether they wish to incur the associated privacy risk, before purchasing a subject application.

8 Claims, 2 Drawing Sheets

(51) Int. Cl.
*H04N 7/16* (2011.01)
*H04W 4/00* (2009.01)
*H04W 12/02* (2009.01)
*H04W 12/08* (2009.01)
*H04L 29/08* (2006.01)

(56) References Cited

U.S. PATENT DOCUMENTS

| | | |
|---|---|---|
| 2007/0240220 A1 | 10/2007 | Tuvell et al. |
| 2007/0266420 A1 | 11/2007 | Hawkins et al. |
| 2008/0263024 A1 | 10/2008 | Landschaft et al. |
| 2009/0119773 A1 | 5/2009 | D'Amore |
| 2009/0313699 A1* | 12/2009 | Jang et al. .................. 726/23 |
| 2010/0100963 A1* | 4/2010 | Mahaffey .................. 726/25 |
| 2010/0153716 A1 | 6/2010 | Kirihata et al. |
| 2010/0242097 A1 | 9/2010 | Hotes et al. |
| 2010/0251340 A1 | 9/2010 | Martin et al. |
| 2010/0257268 A1 | 10/2010 | Landry et al. |
| 2010/0281536 A1 | 11/2010 | Richards et al. |
| 2010/0287151 A1 | 11/2010 | Mustonen |
| 2010/0313035 A1 | 12/2010 | Turbin et al. |
| 2011/0029566 A1 | 2/2011 | Grandison et al. |
| 2011/0047620 A1* | 2/2011 | Mahaffey et al. .............. 726/23 |
| 2011/0161484 A1 | 6/2011 | Van den Bogaert et al. |
| 2011/0167474 A1 | 7/2011 | Sinha |
| 2011/0191852 A1 | 8/2011 | Sanders et al. |
| 2012/0042384 A1* | 2/2012 | Badhwar et al. ............. 726/25 |

OTHER PUBLICATIONS

Perusco, L.; Michael, K.; Control, trust, privacy, and security: evaluating location-based services; Sch. of Inf. Syst. & Technol., Wollongong Univ., NSW; Technology and Society Magazine, IEEE Issue Date: Spring 2007 vol. 26, Issue:1 On pp. 4-16 ISSN: 0278-0097; INSPEC Accession No. 9355070 Cited by: 7 Digital Object Identifier: 10.1109/MTAS.2007.335564 Date of Current Version: Mar. 19, 2007 Sponsored by: IEEE Society on Social Implications of Technology.

Yunxin Liu et al.; Design, Realization, and Evaluation of xShare for Impromptu Sharing of Mobile Phones; Dept. of Comput. Sci. & Eng., Shanghai Jiao Tong Univ., Shanghai, China; Mobile Computing, IEEE Transactions on Issue Date: Dec. 2010 vol. 9, Issue:12 On pp. 1682-1696 ISSN: 1536-1233; INSPEC Accession No. 11615539 Digital Object Identifier: 10.1109/TMC.2010.162 Date of Publication: Sep. 2, 2010 Date of Current Version: Oct. 28, 2010 Sponsored by: IEEE Computer Society.

Leavitt, N.; Will proposed standard make mobile phones more secure?; Computer Issue Date: Dec. 2005 vol. 38, Issue:12 On pp. 20-22 ISSN: 0018-9162 INSPEC Accession No. 8692098 Digital Object Identifier: 10.1109/MC.2005.424 Date of Current Version: Dec. 12, 2005 Sponsored by: IEEE Computer Society.

Grandison, Tyrone; Sloman, Morris; A survey of trust in internet applications; Imperial College, UK; Communications Surveys & Tutorials, IEEE Issue Date: Fourth Quarter 2000 vol. 3, Issue:4 On pp. 2-16 ISSN: 1553-877X Cited by: 17 Digital Object Identifier: 10.1109/COMST.2000.5340804 Date of Current Version: Nov. 24, 2009 Sponsored by: IEEE Communications Society.

Dagon, D.; Martin, T.; Starner, T.; Mobile phones as computing devices: the viruses are coming!; Georgia Inst. of Technol., Atlanta, GA, USA This paper appears in: Pervasive Computing, IEEE Issue Date: Oct.-Dec. 2004 vol. 3, Issue:4 On pp. 11-15 ISSN: 1536-1268 References Cited: 10 Cited by: 12 INSPEC Accession No. 8209955. Digital Object Identifier: 10.1109/MPRV.2004.21 Date of Current Version: Jan. 17, 2005 Sponsored by: IEEE Computer Society.

Shabtai, A.; Fledel, Y.; Kanonov, U.; Elovici, Y.; Dolev, S.; Glezer, C.; Ben-GurionGoogle Android: A Comprehensive Security Assessment; Univ. of the Negev, Beer-Sheva, Israel This paper appears in: Security & Privacy, IEEE Issue Date: Mar.-Apr. 2010 vol. 8, Issue:2 On pp. 35-44 ISSN: 1540-7993 INSPEC Accession No. 11206267 Digital Object Identifier: 10.1109/MSP.2010.2 Date of Publication: Jan. 22, 2010 Date of Current Version: Mar. 29, 2010 Sponsored by: IEEE Computer Society.

* cited by examiner

METHODS AND SYSTEMS FOR RATING PRIVACY RISK OF APPLICATIONS FOR SMART PHONES AND OTHER MOBILE PLATFORMS

RELATED APPLICATIONS

This application is a NONPROVISIONAL of and claims priority to U.S. Provisional Patent Application No. 61/385,200, filed 22 Sep. 2010, incorporated herein by reference.

FIELD OF THE INVENTION

The present invention relates to methods and systems for evaluating and rating privacy risks posed by applications intended for deployment on mobile platforms such as so-called smart phones (i.e., mobile phones that include computing capabilities and/or advanced connectivity capabilities), tablet computers (e.g., Apple Inc.'s iPad™ and similar devices), and the like.

BACKGROUND

Smart phones, tablet computers and similar devices have for some time been provided with the capability to download, install and execute various application programs. Apple Inc.'s iPhone™, iPod Touch™, and iPad™, smart phones based on Google Inc.'s Android™, Nokia Corporation's Symbian™ or Microsoft Corporation's Windows Mobile™ operating systems, and Research In Motion Limited's Blackberry™ devices are all examples of such platforms. To varying degrees, such applications exploit features and functionalities of these platforms in order to provide services to their respective users. In addition, some applications require access to personal information of the users, such as the user's location, the camera on the smart phone, contact lists and the like. In the remaining discussion, the term "mobile platform" will be used to mean all such devices.

So long as applications are well-behaved, that is operating in accordance with their stated or implied intentions, users retain control of their personal information. However, not all applications are well-behaved. Some applications may, whether for malicious reasons or simply due to sloppy programming, expose or seek access to a user's personal information for reasons seemingly unconnected with the stated or perceived purpose of the application. Often, users are unaware of such risks.

SUMMARY OF THE INVENTION

Methods and systems for evaluating and/or rating privacy risks posed by applications intended for deployment on mobile platforms. Validating the "intent" of a mobile platform application vis-à-vis its impact on user privacy, as viewed from an end-user's perspective allows those end-users to make better-informed decisions concerning the downloading, installation and/or operation of mobile platform applications. In making such assessments user preferences can be taken into account. Privacy scores are provided through sales channels for the applications, thereby affording potential users the opportunity to assess whether they wish to incur the associated privacy risk, before purchasing or executing a subject application.

A variety of embodiments of the invention are discussed below. In brief, the present method and systems allow a host computer system to be provided with a copy of a mobile platform application designed for execution on a mobile platform for purposes of fashioning a rating of that application. Together with the application itself, the host may be provided information regarding an intended purpose of the mobile platform application. This allows for assessments of the intended purpose and the actual purpose or operation of the application in order to evaluate the privacy risk. Such risk may be calculated in any number of ways, for example by determining which files stored on or included in the mobile platform or functionalities afforded by the mobile platform are accessed by the mobile platform application during its operation (or its intended operation) on the mobile platform, and whether said accesses are consistent with the intended purpose of the mobile platform application. Based on such determinations, an overall score for the mobile platform application may be determined and presented to potential users of the mobile platform application.

Determining whether accesses are consistent with the intended purpose of a mobile platform application may involve determining discrepancies between the intended purpose of the mobile platform application and its actual purpose, for example as determined through examination of the files or functionalities afforded by the mobile platform that are accessed by the mobile platform application during its operation. In some instances, the present methods and systems may determine a weighted rating for each discrepancy so observed, calculate a weighted average based upon the weighted rating assigned to each of the discrepancies; and calibrate the weighted average to determine the overall privacy score for the application. Other procedures discussed in greater detail below may also be used.

The determination of an application's actual purpose and/or the weighted rating for a subject discrepancy between an intended purpose and an actual purpose may based upon privacy and/or technical criteria. In some cases, the privacy risk assessment may involve determining a probability that the subject discrepancy poses a risk to the potential user's privacy, the type of risk so posed, and/or the degree of severity of the risk. Some or all of these determinations may be made according to user-defined preferences or risk tolerances, thereby affording a "personalized" risk threshold for mobile platform applications of various kinds.

These and further embodiments of the present invention are described in greater detail below.

BRIEF DESCRIPTION OF THE DRAWINGS

The present invention is illustrated by way of example, and not limitation, in the figures of the accompanying drawings, in which.

DETAILED DESCRIPTION

Figure 1:
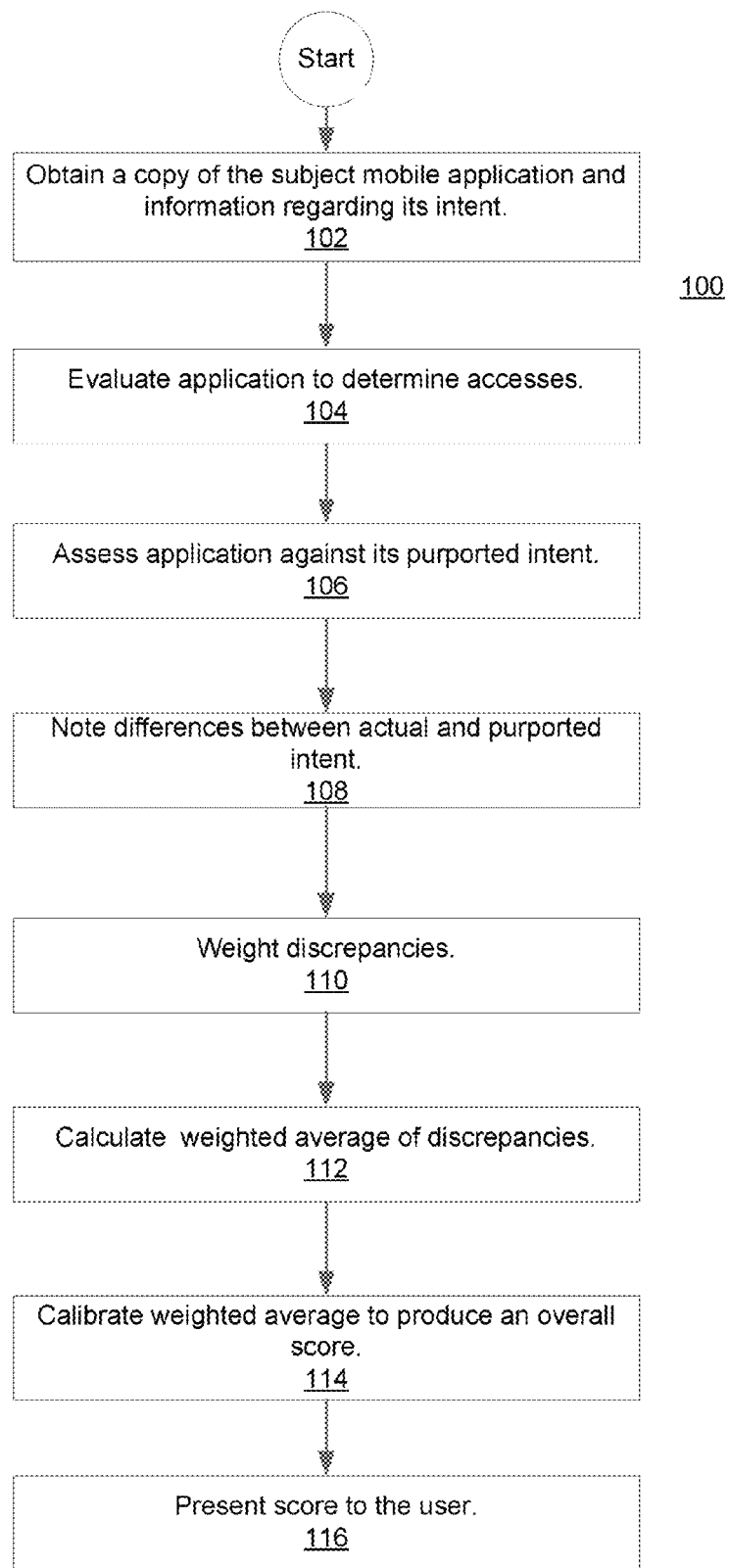
FIG. 1 is a flow diagram illustrating a method of evaluating the intent of an application intended for a mobile platform and assigning one or more scores according to the subject application's respect for the user's privacy, and trustworthiness with respect to observed or determined differences between requested levels of access to components of the mobile platform and the stated intent of the application, in accordance with an embodiment of the present invention.

Described herein are methods and systems for evaluating and rating privacy risks posed by applications intended for deployment on mobile platforms. These methods and systems are useful for validating the "intent" of a mobile platform application vis-à-vis its impact on user privacy, as viewed from an end-user's perspective. In making such assessments user preferences can be taken into account, thereby allowing users to make better-informed decisions concerning the downloading, installation and/or operation of mobile platform applications.

Before describing the present invention in detail it is helpful to understand some of the risks to user privacy that are involved with operation of mobile platform applications. As indicated above, so long as mobile platform applications are well-behaved, users retain control of their personal information. For example, an application that delivers restaurant recommendations to a user based on the user's location might reasonably be expected to require access to information that reveals that user's location. The user can consciously choose to use the application or not, knowing that if he/she uses the application, such location information will be exposed. There may well be significant benefit in allowing that information to be exploited. For example, the user may receive a welcome restaurant recommendation in return for providing transient location information which will soon be stale anyway. Or the user may deem the invasion of the user's privacy to be too great in exchange for the perceived value of the information (for example where a user is required to divulge his or her entire contact list in order to receive a restaurant recommendation). In either case, the well-behaved nature of the application means that the release of personal information does not take place without the user's knowledge and consent (manifest through use of the application for its intended purpose).

However, not all applications are well-behaved. Some applications may, whether for malicious reasons or simply due to sloppy programming, expose or seek access to a user's personal information for reasons seemingly unconnected with the stated or perceived purpose of the application. For example, suppose the restaurant recommendation application did surreptitiously access a user's contact list and use it to spread a computer virus or simply transmit all of the contact information back to a server without the user's knowledge while purporting to look up and provide restaurant recommendations. This masquerading of the underlying theft of personal information would be considered by most users as an invasion of privacy.

Recognizing this potential for mobile platform application to mask or conceal their true functionality behind supposedly useful features, the present inventors have developed systems and methods to validate the "intent" of mobile applications, assign these applications a score, and report that score to the users (or potential users) of the mobile applications, thereby allowing the users to be better informed about the true risk to the user's privacy connected with the installation and/or execution of the application. By validating the "intent" of an application, we mean making an assessment of the impact on the user's privacy, as measured by the application's access to personal information of the user (e.g., personal information stored on the mobile platform or accessible there-through) in light of it's stated or implied purpose. This is a user-centric view of the application's intent, which may in fact be different from a developer-centric view.

The score assigned to the application in accordance with the present invention may be based on a variety of factors. For example, personal preferences of the user may be accounted for in generating the score. So too may social network considerations, such as preferences of groups to which the user belongs or which have previously downloaded and used the application, be accounted for. Of course, the application's respect for the user's privacy, trustworthiness of the application developer (e.g., as measured through evaluations of other applications produced by the developer) and the differences, if any, between the reported or stated intent of the application and that determined through analysis in accordance with the present invention may also be factored into the score (or scores) associated with the subject application.

Assessing the intent of an application may be done in a variety of ways. In essence, the goal is to determine what the application is actually doing when it executes on the mobile platform and evaluate the results against what the application should be doing in order to fulfill its stated purpose. Such an analysis may include both static and dynamic components, or may be entirely static in nature or entirely dynamic in nature. By static, we mean an assessment of information concerning the application in its static state (i.e., not executing on the target mobile platform). By dynamic, we mean the application in its run time state, executing either on the target mobile device or an emulation environment instrumented to determine operating characteristics and activities of the application as it executes. Such dynamic evaluation may require a human user to activate certain features or functions of the application in order to assess the impact thereof, or, in some cases, such actions may be triggered by running the application under the control of a test application configured to act as a human user.

Determining what an application should be doing requires an exercise of judgment. In embodiments of the present invention, experienced professionals make such a determination based on a variety of factors. These factors may include a review of the user documentation provided with the application (e.g., documentation describing the purported purpose and functions of the subject application), a review of a running instantiation of the subject application, discussions with the application's developers, and discussions with users of the subject application, etc. By way of example, if the user documentation for the restaurant recommendation application discussed above indicates that the application will provide restaurants near a user's current location, then one would expect to see the application access information on or through the mobile platform that would reveal that location.

Understanding the purported function of an application can help in understanding the permissions that the application requires in order to deliver a user experience consistent with that function. For example, an application that purports to allow users to send and receive messages to the user's friends, likely requires access to information about those friends, such as email addresses or mobile phone telephone numbers, etc. Therefore, one could expect to see the application requesting access to a user's contact list or similar store of contact information. If such behavior were observed when analyzing the application, then this behavior would be deemed to be consistent with the reported function of the application and even though it impacts the user's privacy or private information, this behavior would not result in a score that indicates significant risk. Thus, by assigning a score that is based on an assessment of the difference between requested levels of access to a user's private information and that expected by the stated intent of the application, the present invention facilitates sound decision making by users contemplating whether or not to download and/or install and run an application on their mobile devices.

The static component of the application analysis may vary according to the type of application and target mobile platform involved. By way of example, consider an application intended for use on a mobile platform that runs the Android operating system. Such applications include a manifest file (e.g., labeled AndroidManifest.xml) in a root directory. The manifest provides information about the application including a description of the activities, services, broadcast receivers, and content providers that the application is composed of. The manifest also declares which permissions the application must have in order to access and/or interact with other software components installed on the mobile platform, libraries that the application must be linked against, and permissions that other applications must have in order to interact with its components. The precise structure of the manifest file is not critical to the present invention, but is described in various support literature for software developers seeking to write application to run on Android devices.

In accordance with an embodiment of the present invention, before an Android application is executed on a mobile device, the manifest for that application is examined to determine the permissions and library calls required by that application. These permissions and calls define the accesses that would be made by the application when running on a mobile device and so an assessment can be made regarding what, if any, personal or private information of a user would be impacted by these accesses. This information is then assessed against the expected accesses that would be required to fulfill the purported functions of the application and a resulting score (perhaps normalized to a particular scale) determined and reported.

The examination of the manifest may occur at any of several times. For example, the application may be submitted for evaluation by its developer prior to, commensurate with or sometime after the application is made available for download by users (e.g., via an "app store" or the like). Or, the application may be assessed when encountered for the first time by an evaluation service that employs the systems and methods of the present invention. This may occur, for example, as part of an audit of an app store or other facility through with users may download applications to their mobile devices.

In other instances, the examination may be triggered by a user's attempted download of the subject application to or execution of the subject application on the user's mobile device. For example, the mobile device may be configured with an evaluation application running in the background, which evaluation application is configured to detect attempted downloads of new applications and upon such detection to seek an evaluation score (e.g., from a rating service) or make its own evaluation in accordance with the above-described procedure. In one embodiment of the invention, the rating service may operate a server or other host where evaluation scores (computed in accordance with the invention) are maintained and, upon being contacted by the evaluation application running on the mobile device (e.g., by way of a data channel or other communication channel) may return an evaluation score for the application which the user wishes to download if one exists. For example, the mobile device may provide the name and version number or other identifying information for the subject application being downloaded and this information may be used by the rating service server to consult a table or other data structure to determine whether the subject application being downloaded has been previously evaluated. If so, the server may return the previously determined evaluation score to the mobile device and that score may be presented to the user via a display on the mobile device. In conjunction with displaying the score, the evaluation application may provide the user with an option to continue with the download of the application or abort same.

Where the rating service does not have an evaluation score for the subject application being downloaded, the evaluation application may perform an on-the-fly analysis of the subject application being downloaded. For example, in the case of an Android application, the evaluation application on the mobile device may permit the subject application (or portions or files thereof) to be downloaded, examine the manifest accompanying the application, and assess the information derived from the manifest against other information accessible to the evaluation application concerning the purported function or intent of the subject application. Such function or intent application may be available from the server operated by the rating service (even if the subject application itself has not yet been evaluated), from the app store or other host from which the subject application is being downloaded (e.g., in a separate file maintained by the app store or simply by parsing an information page regarding the application), or from the user (e.g., the user may be asked to categorize the application as one that involves messaging, location services, etc. so that a determination as to the kinds of accesses which the subject application will require can be made).

In lieu of or in addition to the static assessment process discussed above, a dynamic assessment of a subject application may also be employed. Such an assessment involves running the subject application in a controlled environment, such as a mobile platform emulator or a mobile platform configured as a test environment, and determining, as the subject application is executing, the calls and accesses which it makes to other components of the mobile platform. Such testing may require that an operator interact with the subject application in the test environment so that all of the features and functions of the subject application are subjected to the evaluation. By monitoring the calls, accesses and outputs of the subject application, a determination as to the risks presented by the operation of the subject application to a user's private information and/or privacy can be made and this information used (perhaps in conjunction with information derived from a static evaluation of the subject application) to determine a score.

The scores discussed herein, whether produced as a result of static and/or dynamic evaluations, are, in effect, ratings of the subject applications from the standpoint that the scores a relative assessments of the risks presented by the applications vis-à-vis a user's personal or private information. Of course, other assessments could also be made.

The scores may, and likely will, be weighted scores so that user's can make rapid determinations regarding the risks presented by applications. For example, the scores may be weighted according to accesses made by an application to a mobile device's file system, hardware features, user private information, mobile device configuration information, and so on. Scores may be reported in any convenient fashion, for example through the use of letter grades, numbers, colors, etc., any of which may be calibrated to reflect an assessed level of risk by a rating service operating in accordance with the present invention. Highly risky applications may, for example, be coded Red, or assigned scores that reflect the concomitant risk. Less risky applications, may be coded Green, or assigned scores that reflect their rather benign impact on a user's privacy. Applications with risk profiles that fall in-between these extremes may be coded or assigned scores accordingly, and uses may be advised of the meaning behind a color code or a particular score, for example though collateral materials provided with an evaluation application or through a help screen or other information mechanism associated with the application or the service.

In one embodiment of the invention, a single score is presented for the user. However, in other instances, multiple scores, each associated with a particular category, facility or other profile may be provided. In some cases, scores may be examined by a user to determine how they were computed.

That is, a user may be provided the ability to obtain information regarding various evaluations which went into determining an overall score (or risk profile) for a subject application.

The score or scores may be provided to a user in advance of downloading an application, after downloading but before installation of an application, after installation but prior to execution of an application, upon launch of an application, or at some other time. In the case of applications already installed on a mobile platform, an overall assessment of the risk posed to a user's privacy by some or all of those applications may be provided, e.g., as part of an audit by an evaluation service or an evaluation application when the evaluation application is first installed on the mobile device or periodically as requested by the user.

FIG. 1 is a flow diagram illustrating a method 100 of evaluating the intent of an application intended for a mobile platform and assigning one or more scores, which may be adapted based on a user's specified preferences, according to the subject application's respect for the user's privacy, and trustworthiness with respect to observed or determined differences between requested levels of access to components of the mobile platform and the stated intent of the application, in accordance with an embodiment of the present invention. As indicated above the score(s) allow(s) a user to make an informed decision regarding downloading and/or use of the subject application.

At the outset, a copy of the subject mobile application, either in an executable format or source code format, and information regarding the intent of that application (e.g., as supplied by its developers or understood from the application's proposed functionality) are obtained 102. Next, the application is evaluated to determine what accesses it makes to the mobile platform and/or the user's information on that platform 104. The evaluation may include a review of any or all of the following:

system-level and/or file system permissions requested and/or required by the application to function;
access to user location information;
access to network connections;
access to the users' inbound and/or outbound messaging applications (e.g., email, text messaging, etc.) and/or contact lists used or accessed by those applications; and
access to hardware resources (e.g., microphones, speakers, cameras, displays, storage, removable storage, etc.).

As evaluated, the application is then assessed against its purported intent, as understood from its proposed functionality and/or as determined from information provided by the application developer 106, and any differences are noted 108. For example, if the application's stated functionality is to identify restaurants near you, then it accessing your location data is expected and there is no identified discrepancy if the application is observed requesting same. However, if the application is purportedly a recipe finder, and it is observed attempting or requesting access to the user's location data, this is determined to be a likely violation of the user's privacy in conflict with the stated intent of the application. This discrepancy is noted.

Any and all such discrepancies between the application's intended functionality, and concomitant required accesses and permissions, and the observed accesses and/or requests are then weighed 110 according to the impact on the user's privacy and/or based on the user's preferences. In some cases, the weight of a particular category and/or criterion may be user configurable. For example, some user's may specify a very high level of tolerance for revealing personal information (such as location data), while other user's may prefer to forbid any revelation of such information. These kinds of user preferences can be accounted for through such weightings.

Next, at step 112, a weighted average of all the discrepancies discussed above is calculated and that weighted average may be calibrated 114 to a pre-determined scale to produce an overall score. In some cases, the calibrated values may be affected by user community input (not shown in detail in FIG. 1). The score is then presented to the user 116, thereby allowing the user to make an informed determination regarding downloading and/or use of the subject application. Where desired, the user may be provided the ability to reveal details regarding how the score was impacted by the various discrepancies noted during the evaluation. As indicated above, the evaluations may be applied to mobile applications resident on a mobile platform as well as those that are being downloaded or copied to the platform. Additionally the mobile platforms may communicate with a server or other host that can enforce policy restrictions regarding the downloading of applications that fail to meet certain score criteria. This may especially useful in the case of enterprises that wish to provide users the ability to download applications to mobile platforms, provided those applications do not pose security risks for the users and/or the enterprise.

Table 1 provides an example of how ratings scores for mobile platform applications may be computed. The mobile platform applications (designated App #1 and App #2) used for this example may be games, social media applications, lifestyle applications, financial applications, or any other mobile platform applications. In the example provided, both App #1 and App #2 are designed to operate using the Android operating system however, it should be understood that a similar analysis might be performed for applications operating on any available mobile platform operating system. In the examples of Table 1, the scores of both applications are determined based on a scale of 0-100 however, any scale, or order of magnitude (e.g., 10, 1000, 10000, etc.) for scoring the applications may be used.

TABLE 1

| No. | Criteria | Weight | App #1 Rating | App #1 Score | App #2 Rating | App #2 Score |
|---|---|---|---|---|---|---|
| P1 | Trusted Source | 5 | 0 | 0 | 1 | 5 |
| P2 | Source Rating | 5 | 0.5 | 2.5 | 1 | 5 |
| P3 | Number Of Other Mobile platform applications By Developer | 2.5 | 1 | 2.5 | 0.5 | 1.25 |
| P4 | Developer's Average User Rating | 2.5 | 0.75 | 1.875 | 1 | 2.5 |
| P5 | Application's Time In Marketplace | 3 | 1 | 3 | 0.5 | 1.5 |
| P6 | Developer's Time In Marketplace | 2.5 | 1 | 2.5 | 0.5 | 1.25 |
| P7 | Number Of Comments | 1.5 | 1 | 1.5 | 1 | 1.5 |
| P8 | Developer's Location | 1.5 | 0.8 | 1.2 | 1 | 1.5 |
| P9 | Category Associated With Application | 1.5 | 1 | 1.5 | 1 | 1.5 |
| T1 | Permissions Requested | 40 | 0.2 | 8 | 1 | 40 |
| T2 | Interfaces | 3 | 0.5 | 1.5 | 1 | 3 |
| T3 | Imported Classes | 10 | 0.2 | 2 | 1 | 10 |
| T4 | Services | 3 | 0.75 | 2.25 | 1 | 3 |
| T5 | Use Of Third Party Code | 5 | 0.75 | 3.75 | 0.5 | 2.5 |
| T6 | Excessive Log Writing | 1 | 0.75 | 0.75 | 0.75 | 0.75 |
| T7 | Executive Calls | 2.5 | 1 | 2.5 | 1 | 2.5 |
| T8 | Reading/Writing Network Interface Info | 3 | 0.75 | 2.25 | 1 | 3 |

TABLE 1-continued

| No. | Criteria | Weight | App #1 Rating | App #1 Score | App #2 Rating | App #2 Score |
|---|---|---|---|---|---|---|
| T9 | Interesting IP Addresses/Domains | 5 | 0 | 0 | 1 | 5 |
| T10 | Code Obfuscation | 2.5 | 0 | 0 | 0 | 0 |
| | Overall Score | 100 | | 39.575 | | 90.75 |

The criteria used to evaluate the mobile platform applications shown in Table 1 are examples. More, fewer or other criteria may be used, and individual application evaluation criteria may vary across application domains. For example, financial applications may be evaluated using more, fewer or different criteria than games. Thus, the specific criterions shown in Table 1 should not be read as limiting the present invention.

In this example, the evaluation criteria are separated into two main categories: market based or privacy criteria and technical criteria. In the example provided in Table 1, there are nine market based/privacy criteria (indicated as P1-P9) and ten technical criteria (indicated as T1-T10). Of course, any number of criteria may be used to evaluate a mobile platform application in varying embodiments of the present invention. In some cases, evaluation under one or more market based or privacy criteria and/or technical criteria may be performed by a computer system other than a mobile platform prior to or commensurate with an installation of the application on a mobile platform, by the mobile platform itself as part of or following installation of the application, or by some combination thereof.

The relative importance of these evaluation categories and criterion within these categories to one another and the overall score of a mobile platform application may be reflected by a relative weight as shown in the "weight" column of Table 1. For example, the importance of the "Permissions Requested" criterion (T1) is assigned a relatively high weight (in this case 40), which indicates the relatively high importance of the "Permissions Requested" of an evaluation result of the mobile platform application according to this criterion relative to the other criteria listed in Table 1. In contrast, the "Developer's Location" criterion (P8) is assigned a relatively low weight (1.5) which indicates the relatively low importance of an evaluation result of the mobile platform application according to this criterion.

Evaluation of a mobile platform application under the first market based/privacy criterion, "Trusted Source" (P1) indicates a degree to which the source of the mobile platform application is trusted or has a trustworthy reputation. A mobile platform application provided by a trusted source typically receives a higher rating when evaluated according to the P1 criterion than an application provided by an unknown, or untrustworthy, source. Evaluations according to this criterion may be based on, for example, an evaluation of a past history, or reputation, of a source. Typically, commercial marketplaces for mobile platform applications (e.g., the Android Marketplace or Apple's App Store) receive a high rating when evaluated under this criterion even though, at times, they allow users to download applications with privacy-related and other issues. This is due, at least in part, to a commercial marketplace's ability to, for example, track a source of a mobile platform application, monitor user complaints regarding a mobile platform application, and remotely remove unwanted applications from a it's marketplace or a mobile platform.

In the example provided in Table 1, the App #1 mobile platform application received rating of 0 because upon evaluation of the mobile platform application under the "Trusted Source" criteria, it was determined that the source of App #1 is not trusted. In contrast, evaluation of the App #2 mobile platform application indicated that its source is trusted. Therefore, App #2 received the full amount of points available (1) as its rating under this criterion.

Evaluation of a mobile platform application under the second market based/privacy criterion, "Source Rating" (P2), indicates a source's rating (e.g., a 5-star rating) of the application. In cases where a particular source does not have a rating for a mobile platform application, the mobile platform application may be matched to a mobile platform application available on a different source. For example, a manifest file or signature of a mobile platform application may be analyzed and then matched to a manifest file or signature of the mobile platform application available from a different source that includes a rating of the mobile platform application. On some occasions, fuzzy logic, such as close matches, synonyms, or homonyms, for the mobile platform application's name may be used.

Upon evaluation of App #1 under the "Source Rating" criterion, it was determined that its rating from a particular source was 2.5 stars out of 5. Therefore, it was assigned a rating of 0.5, or half, which when multiplied by the weight assigned to this criterion (5), yielded a score of 2.5. The source rating for App #2 was determined to be 4.5 out of 5 stars and was therefore assigned a value of 1, which when multiplied by the weight assigned to this criterion, yielded a score of 5.

Evaluation of a mobile platform application under the third market based/privacy criterion, "Number Of Other Mobile platform applications By Developer" (P3), indicates a how many other mobile platform applications are associated with a developer of the mobile platform application at issue. Evaluation of a mobile platform application under this criterion takes into account the probability that a developer who has developed more applications also has more software development knowledge and potentially a stronger reputation and is therefore considered less likely to create an application with a privacy-related risk.

The developers of App #1 have developed 20 additional mobile platform applications, which is a relatively high number when compared with other software developers. Therefore, App #1 was assigned a rating of 1 under the P2 criterion, which when multiplied by the weight assigned to this criterion, yields a score of 2.5. In contrast, the developers of App #2 have developed only three additional mobile platform applications, which is a relatively low number when compared with other software developers. Therefore, App #2 was assigned a rating of 0.5, which when multiplied by the weight assigned to this criterion, yields a score of 1.25.

Evaluating the mobile platform application according to any of the remaining market based criteria (P4-P9) may be performed in a manner similar to the processes described above with regard to criteria numbers P1-P3. For example, evaluation of the mobile platform application under a "Developer's Average User Rating" (P4) criterion incorporates a developer's average user rating into the scoring of a mobile platform application associated with the developer.

Evaluation of a mobile platform application under an "Application's Average Time In Marketplace" (P5) criterion incorporates how long the mobile platform application has been available for downloading by a user into the scoring of the mobile platform application. Typically, the longer an application has been available, the higher it's rating, when evaluated according to this criterion, will be.

Evaluation of the mobile platform application under a "Developer's Average Time In Marketplace" (P6) criterion incorporates how long the developer of the mobile platform application has been know to develop mobile platform applications user into the scoring of the mobile platform application. Typically, the longer a developer has been known to develop mobile platform applications, the higher it's rating, when evaluated according to this criterion, will be.

Evaluation of the mobile platform application under a "Number Of Comments" (P7) may include, for example, doing a keyword search of, for example, websites known to provide mobile platform application ratings for in order to count ratings or other opinions regarding the evaluated mobile platform application. In some embodiments, the valuation of the mobile platform application under the P7 criterion may also include determining an overall indication of the comments (e.g. positive or negative). Typically, the more comments found regarding a mobile platform application and/or positive ratings of the mobile platform application, the higher it's rating, when evaluated according to this criterion, will be.

The mobile platform application may also be evaluated according to a "Developer's Location" (P8) criterion. This evaluation may include determining a country of origin associated with the developer, wherein mobile platform applications associated with countries known to be a source of mobile platform applications with privacy related problems might receive a relatively low rating when evaluated under this criterion.

The category or type of a mobile platform application may also be evaluated as indicated by the "Category Associated With Mobile platform application" (P9) criterion. Some types of applications are inherently more of a privacy concern than other applications. For example, a mobile platform application included in the category of a "contact manager" typically accesses a user's contact information, which poses an inherent privacy risk. While access to this information may be legitimate for a specific category of mobile platform application, it inherently has a higher a privacy risk than applications in other categories and may receive a relatively lower score when evaluated under this criterion.

Scores based upon evaluation of the technical criteria listed in Table 1 may be generated based upon, for example, a technical analysis of a mobile platform application. The first technical criterion, "Permissions Requested" (T1) is the most heavily weighted criterion listed in Table 1. Evaluation under the "Permissions Requested" criterion may involve, for example, determining what, if any, files stored on a mobile platform the mobile platform application requests permission to access during, for example, installation and/or operation. For example, when the mobile platform application is operable on the Android platform, evaluation of the mobile platform application according to the "Permissions Requested" criterion may include analyzing the mobile platform application's manifest file, for example, prior to, during, and/or after installation on a mobile platform in order to determine any data files resident on the mobile platform that it may request permission to access.

When evaluation of a mobile platform application indicates that it requests permission to access a data file that is deemed risky to a user's privacy, the mobile platform application's rating may be decreased according to a perceived privacy risk. Exemplary permissions that may be deemed risky to a user's privacy include permissions for accessing a user's contact information, geo-location position, SMS messages, voice mails, emails, stored bookmarks, and other personal information.

For example, upon evaluation of the App #1 application according to the "Permissions Requested" criterion indicates that it will seek permission to access a relatively high number of data files and/or will seek permission to access data files that are likely to risk a user's privacy. Therefore, the App #1 application received a relatively low rating (e.g., 0.2) when evaluated according to this criterion which, when multiplied by it's weight (40), yields a score of 8. In contrast, the App #2 mobile platform application makes relatively few, or no, request to access data files on a mobile platform that raise privacy concerns. Therefore, when analyzed according to the "Permissions Requested" criterion, the App #2 application received a relatively high rating (e.g., 0.1) which, when multiplied by it's weight (40), yields a score of 40.

Technical criteria T2-T8 may be used to evaluate the mobile platform application in order to determine potential privacy risks to a user caused by how the mobile platform application was develop and/or coded. For example, evaluation of the mobile platform application according to the "Interfaces" criterion (T2) determines whether the mobile platform application allows any other applications to communicate with the subject mobile platform application through its interfaces. Evaluation of the mobile platform application according to the "Imported Classes" criterion (T3) determines whether the application code of the mobile platform application loads any system code (e.g., imported classes) onto the mobile platform and evaluation according to the "Imported Classes" criterion (T4) indicates whether the mobile platform application includes any imported classes that are deemed to be adverse to a user's privacy.

Evaluation of the mobile platform application according to the "Use of Third Party Code" criterion (T5) determines if the mobile platform application includes, or operates with, any software code associated with a third party as occurs with, for example, third party advertising used by the mobile platform application. When the mobile platform application includes, or operates with, the software code of a third party, the evaluation according to criterion T5 may include determining if the third party code could be a privacy concern to the user.

Evaluation of the mobile platform application according to the "Excessive Log Writing" criterion (T6) determines whether data stored on the mobile platform could be leaked to a third party via excessive data written to the system logs. Evaluation of the mobile platform application according to the "Executive Calls" criterion (T7) determines whether the mobile platform application is know to attempt or is likely to attempt execution unmanaged code on the mobile platform that may lead to security or privacy risks, such as buffer overflows.

Evaluation of the mobile platform application according to the "Reading/Writing Network Interface Info" criterion (T8) determines whether there is an indication that the mobile platform application may read or write to the mobile platform's network interfaces as this type of activity has been linked to malicious mobile platform applications that charge a user for additional services or usage. Exemplary network interface information that may be read or written includes a mobile platform's access point name (APN) or mobile directory number (MDN).

Evaluation of the mobile platform application according to the "Interesting IP Addresses/Domains" criterion (T9) determines whether the mobile platform application is attempting to communicate with an IP address and/or domain with a reputation for presenting risks to a user's privacy.

Evaluation of the mobile platform application according to the "Code Obfuscation" criterion (T10) determines whether the mobile platform application attempt to obfuscate the code that makes up some, or all, of the mobile platform application. The obfuscation of code may be indicate that the application is performing an action which it wishes to hide from a user may therefore pose a risk to the user's privacy. When a mobile platform application does not attempt to obfuscate its code, it may receive a high rating (e.g., 1) under the "Code Obfuscation" category which, when multiplied by the weight for this category, may yield a score of 2.5.

Upon completion of the evaluation of a mobile platform application under one or more evaluation criteria, such as those set forth in Table 1 for example, an overall score may be calculated. The overall score may be an arithmetic sum of the total points scored to an application, a weighted average score for the mobile platform application based upon its ratings and/or scores, or another computed total. In the example of Table 1, the App #1 mobile platform application received an overall score of 42.075 and the App #2 mobile platform application received an overall score of 93.25.

Figure 2:
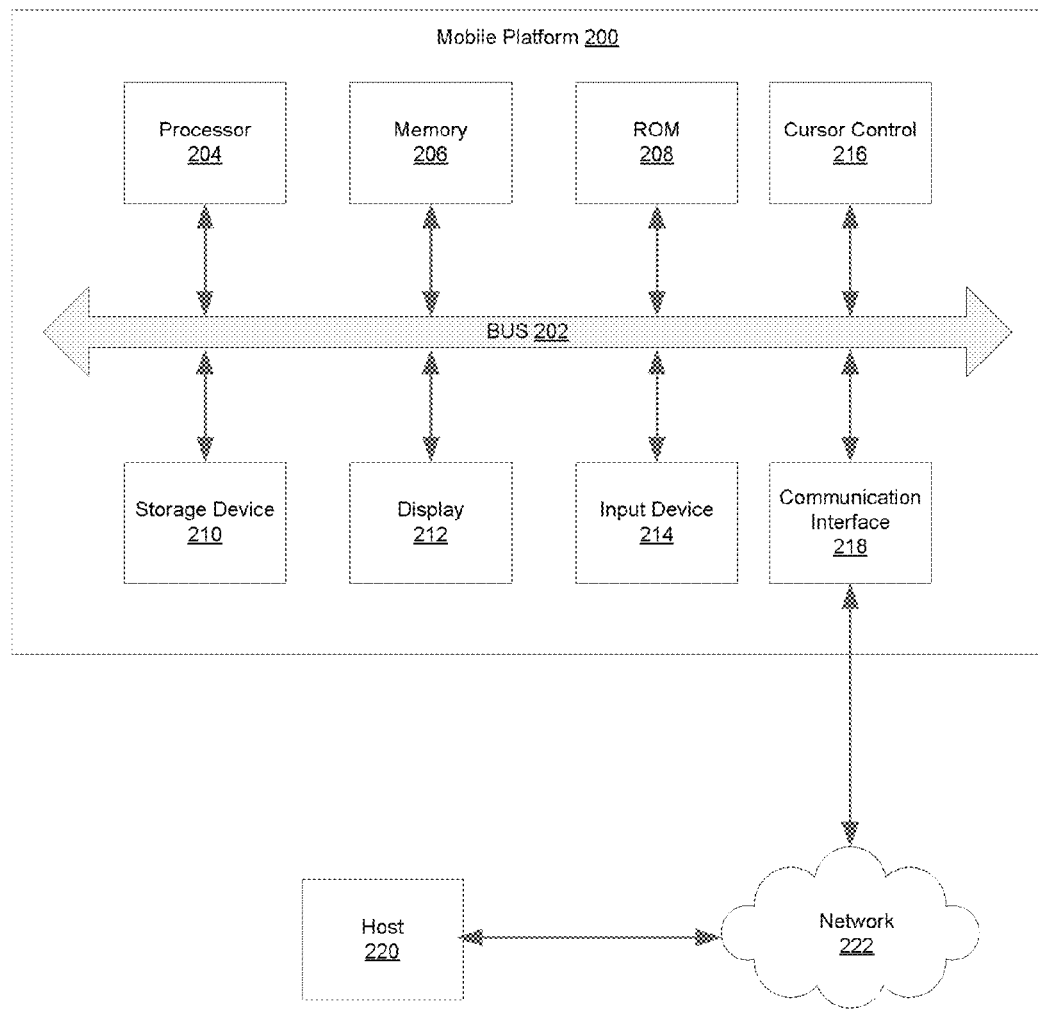
FIG. 2 illustrates an example of a mobile platform on which embodiments of the present invention may be instantiated.

As should be evident from the foregoing discussion, various embodiments of the present invention may be implemented with the aid of computer-implemented processes or methods (a.k.a. programs or routines) that may be rendered in any computer-readable language. An example of a mobile platform on which embodiments of the present invention may be instantiated (e.g., in the form of computer-readable instructions stored in one or more computer-readable storage mediums such as, but not limited to, any type of disk including floppy disks, optical disks, compact disk read only memories (CD-ROMs), and magnetic-optical disks, read-only memories (ROMs), flash drives, random access memories (RAMs), erasable programmable read only memories (EPROMs), electrically erasable programmable read only memories (EEPROMs), flash memories, other forms of magnetic or optical storage media, or any type of media suitable for storing electronic instructions) is shown in FIG. 2.

Mobile platform 200 includes a bus 202 or other communication mechanism for communicating information, and a processor 204 coupled with the bus 202 for processing information. Mobile platform 200 also includes a main memory 206, such as a RAM or other dynamic storage device, coupled to the bus 202 for storing information and instructions to be executed by processor 204. Main memory 206 also may be used for storing temporary variables or other intermediate information during execution of instructions to be executed by processor 204. Mobile platform 200 further includes a ROM 208 or other static storage device coupled to the bus 202 for storing static information and instructions for the processor 204. A storage device 210, such as a flash drive, is provided and coupled to the bus 202 for storing information and instructions.

Mobile platform 200 may also include a display 212 for displaying information to a user. An input device 214, including alphanumeric and other keys, may be provided as well (e.g., for communicating information and command selections to the processor 204). Another type of user input device is cursor control 216, such as a trackball or cursor direction keys, may be provided for communicating direction information and command selections to processor 204 and for controlling cursor movement on the display 212. In other instances, the alphanumeric and cursor inputs may be provided via a touch-sensitive display.

According to one embodiment of the invention, the foregoing methods and data structures are instantiated in computer software executed by mobile platform 200, that is by processor 204 executing sequences of instructions contained in main memory 206. Such instructions may be read into main memory 206 from another computer-readable medium, such as storage device 210. Execution of the sequences of instructions contained in the main memory 206 causes the processor 204 to perform the process steps described herein.

Mobile platform 200 may also include a communication interface 218 coupled to the bus 202. Communication interface 208 provides for two-way data communication to and from the mobile platform 200. For example, communication interface 218 may include a wireless radio configured to operate with a telecommunication carrier's network and/or a computer communication network (e.g., a WiFi or other such network). In any such implementation, communication interface 218 sends and receives electrical, electromagnetic or optical signals which carry digital data streams representing various types of information. For example, two or more mobile platforms 200 may be networked together with each using a respective communication interface 218. Also, a mobile platform 200 may communicate with a server or other host 220 (e.g., one which provides the evaluation service discussed above) via communication interface 218 and a network 222.

Thus, methods and systems for evaluating and rating privacy risks posed by applications intended for deployment on mobile platforms and the like have been described.

What is claimed is:

1. A method, comprising:
receiving, by a computing system, a copy of a mobile platform application designed for execution on a mobile platform, the copy including a stated purpose for the mobile platform application, the mobile platform having one or more files including personal information stored thereon;
determining, by the computing system, (i) an intended purpose of the mobile platform application, wherein determining the intended purpose of the mobile platform application includes determining what the mobile platform application does when executing on the mobile platform and evaluating the results against what the mobile platform application should be doing in order to fulfill the stated purpose, (ii) one or more files stored on or included in the mobile platform or functionalities afforded by the mobile platform that are accessed by the mobile platform application during its operation on the mobile platform, (iii) whether said accesses include accesses to the personal information and, if so, whether said accesses are consistent with the intended purpose and the stated purpose of the mobile platform application, and (iv) an overall score for the mobile platform application based upon said determinations, wherein determining whether said accesses are consistent with the intended purpose and the stated purpose of the mobile platform application involves determining one or more discrepancies between the intended purpose of the mobile platform application and the stated purpose of the mobile platform application;
determining a user configurable weighted rating for each of the discrepancies according to its impact on a user's privacy and based on the user's preferences;
calculating a weighted average based upon the weighted rating assigned to each of the discrepancies; and
calibrating the weighted average to determine the overall score; and
presenting the overall score to a potential user of the mobile platform application.

2. The method of claim 1, wherein the intended purpose is further determined from information regarding said intended purpose of the mobile platform application received in conjunction with the copy of the mobile platform application.

3. The method of claim 1, wherein the determination of the weighted rating for a subject discrepancy is based upon at least one of a privacy criterion and a technical criterion.

4. The method of claim 1, wherein determining the weighted rating for a subject discrepancy includes at least one of:
   determining a probability that the subject discrepancy poses a risk to the potential user's privacy;
   determining a type of risk the subject discrepancy poses to the potential user's privacy; and
   determining a degree of severity for a risk the subject discrepancy poses to the potential user's privacy.

5. The method of claim 1, wherein at least one of the determinations are user configurable.

6. The method of claim 1, wherein the mobile platform application is received by the computing system from the mobile platform.

7. The method of claim 6, wherein the mobile platform application is received by the computing system from the mobile platform as part of an installation or execution process for the mobile platform application on the mobile platform.

8. The method of claim 1, further comprising:
   evaluating the copy of the mobile platform application according to a criterion; and
   determining the overall score responsively to the evaluation.

* * * * *